United States Patent [19]
Binnig et al.

[11] Patent Number: 5,831,153
[45] Date of Patent: Nov. 3, 1998

[54] INVESTIGATION AND/OR MANIPULATION DEVICE FOR A SAMPLE IN FLUID

[75] Inventors: Gerd Karl Binnig, Wollerau; Walter Haeberle, Waedenswil, both of Sweden

[73] Assignee: International Business Machines Corporation, Armonk, N.Y.

[21] Appl. No.: 801,049

[22] Filed: Feb. 14, 1997

[51] Int. Cl.$^6$ .................................................. G01B 5/28
[52] U.S. Cl. .................................................. 73/105
[58] Field of Search ........................ 73/105; 250/306

[56] References Cited

U.S. PATENT DOCUMENTS

| | | | |
|---|---|---|---|
| 4,935,634 | 6/1990 | Hansma et al. | 250/306 X |
| 5,291,775 | 3/1994 | Gamble et al. | 73/105 |
| 5,294,804 | 3/1994 | Kajimura | 250/306 X |
| 5,463,897 | 11/1995 | Prater et al. | 73/105 |

OTHER PUBLICATIONS

Baselt et al., "Scanned–Cantilever Atomic Force Microscope", Rev. Sci. Instrum., vol. 64, No. 4, Apr. 1993, pp. 908–911.

Drake et al., "Imaging Crystal, Polymers, and Processess in Water with the Atomic Force Microscope", Science, vol. 243, 24 Mar. 1989, pp. 1586–1589.

Maivald et al., "Using Force Modulation to Image Surface Elasticities with the Atomic Force Microscope", Nanotechnology, vol. 02, 1991, pp. 103–106.

*Primary Examiner*—Daniel S. Larkin
*Attorney, Agent, or Firm*—Whitham, Curtis & Whitham; Casey P. August

[57] ABSTRACT

An investigation and/or manipulation device for a sample which is located in a container fluid includes an investigation and/or manipulation tool which is mounted at a first of a cantilever and which during investigation and/or manipulation of the sample immerses into the container fluid. The opposite side of the cantilever is at least partly not immersed into the container fluid during investigation.

20 Claims, 2 Drawing Sheets

INVESTIGATION AND/OR MANIPULATION DEVICE FOR A SAMPLE IN FLUID

TECHNICAL FIELD

The invention relates to an investigation and/or manipulation device for a sample which is located in a fluid. More particularly the invention relates to an atomic force microscope for investigating the surface of a sample that is placed in a fluid.

BACKGROUND OF THE INVENTION

U.S. Pat. No. 5,463,897 is related to a scanning stylus atomic force microscope with cantilever tracking and optical access. The AFM can be provided with a removable fluid cell allowing operation with the sample and the cantilever covered by fluid. The deflection of the cantilever is detected with light.

Another scanning force microscope is disclosed in U.S. Pat. No. 5,319,960. This microscope has the capability of scanning a sample in contact with a fluid. The sample as well as the whole cantilever is positioned in the fluid. Also here, the detection of the cantilever detection is achieved by using light.

In U.S. Pat. No. 4,935,634 is described an atomic force microscope with a replaceable fluid cell.

All the above embodiments of atomic force microscopes have in common that the cantilever immerses completely into the fluid in which the sample is located.

OBJECT AND ADVANTAGES OF THE INVENTION

In the following the fist side of the cantilever where the tool is located is called underside and the opposite side is called upper side. This is for better understanding only. If the arrangement is used in an upside-down position or any other position the more general definition of the sides may be more suitable.

The investigation and/or manipulation device of the invention shows the advantage that due to the fact that the upper side of the cantilever does not completely immerse into the container fluid, the cantilever can be provided with electronic equipment without risking failure e.g. due to electrical shorts. Hence, electrical deflection sensors, such as piezoresistive sensors can be used for detecting the cantilever deflection. Furthermore, generally fewer parts of the investigation and/or manipulation device come into contact with the container fluid. This is advantageous since the parts that do not contact the container fluid can be designed independent from the properties of the container fluid. Also, any modification of the already installed cantilever is easier because the cantilever is easily accessible without the need to remove other protecting means, e.g. a sag means. Also, the mechanical properties of the cantilever remain more unamended without such additional protecting means.

In the dependent claims various modifications and improvements of the investigation and/or manipulation device are contained.

Using a gap between the cantilever and a flow-limiting means proves advantageous since this represents a simple and easily realizable solution of the problem how to prevent the container fluid from flowing to the upper side of the cantilever. Hence, no complicated and expensive controlling of the cantilever's height is needed.

Using a movable means brings the advantage that the risk that the container fluid flows through the gap is minimized since the movable means provides a stable gap even impermeable for gaseous molecules of the container fluid, functioning as well in non-horizontal positions, useable for container fluids with a very low surface tension and also stable against mechanical shock.

Using the surface tension of the container fluid is particularly advantageous because by this exploit of natural behavior, the costs for the realization of the inventive solution are reduced. No extra flow-limiting bridge element, e.g. a movable means, over the gap is needed.

If one chooses the gap dimensions such that the container fluid does not flow through the gap, one has more possibilities of choice of container fluid types. Even container fluids with a low surface tension can then be used. The gap may even be designed to have a variable gap width and may have a gap-width-adjusting means therefor.

Using counter pressure, again broadens the range of usable container fluids. Counter-pressure is furthermore usable for balancing pressure exerted by the container fluid or for exerting a pressure on the container fluid to simulate certain pressure conditions for the sample immersed in the container fluid.

Using an assistant fluid is a cheap alternative to a movable means or a counter-pressure-exerting means. This assistant fluid may even serve for other purposes, e.g. as a damping fluid for the cantilever. It suffices if the assistant fluid does not mix with the container fluid.

To connect the cantilever to an adjacent flow-limiting means, either directly or indirectly via a bridging member, is an advantageous solution since this arrangement needs fewer parts and hence has a facilitated manufacturing process.

Positioning a sensing means on the cantilever has the advantage that the sensing means can be used to measure the deflection though sensing of the mechanical bending of the cantilever instead of measuring e.g. via optical means.

Locating the sensing means at the upper side uses the advantage of the invention that this upper side is not in contact with the container fluid and it hence is possible to choose for the sensing means e.g. the location at the cantilever which is undergoing the highest deformation, such that the best sensitivity is achieved. Furthermore, the sensing means can be designed without taking care of negative effects of the container fluid on the sensing means.

Adding a supply and/or removing means to the investigation and/or manipulation device means to provide the investigation and/or manipulation device with the capability to be used for samples immersed in a container fluid without having to take care of how the container fluid is brought to the investigation and/or manipulation device. The supply and/or removing means can hence be optimally designed and adjusted for minimal negative effect on the device's behavior and precision and then be installed for multiple use.

SUMMARY OF THE INVENTION

The invented investigation and/or manipulation device comprises an investigation and/or manipulation tool, such as a tip which is mounted at the underside of a cantilever. With a positioning means the tool can be scanned over the surface of a sample and the tool can either be used to investigate the surface by measuring a deflection that occurs due to interactive forces between the tool and the sample, or to manipulate the sample, i.e. to modify the surface, e.g. by creating indentations. The investigation and/or manipulation device is particularly suited for samples that are positioned in a fluid. This may for instance be necessary for biological samples which only live in a humid environment. It is also recommended to immerse a sample in a fluid when it already has a fluid film on it, since capillary effects may falsify the investigation or manipulation result or even damage the tip. Another function of a fluid cm be the duty to keep particles, e.g. dust away from the sample.

The invented investigation and/or manipulation device is designed such, that the cantilever touches the fluid at its underside, so that the tool immerses into the fluid but the upper side of the cantilever does not completely have contact to the fluid.

DESCRIPTION OF THE DRAWINGS

Examples of the invention are depicted in the drawings and described in detail below by way of example. It is shown in FIG. 1a: a first embodiment of an investigation and/or manipulation device according to the invention in side view.

All the figures are for sake of clarity not shown in real dimensions, nor are the relations between the dimensions shown in a realistic scale.

DETAILED DESCRIPTION OF THE INVENTION

In the following, various exemplary embodiments of the invention are described.

Figure 1A:
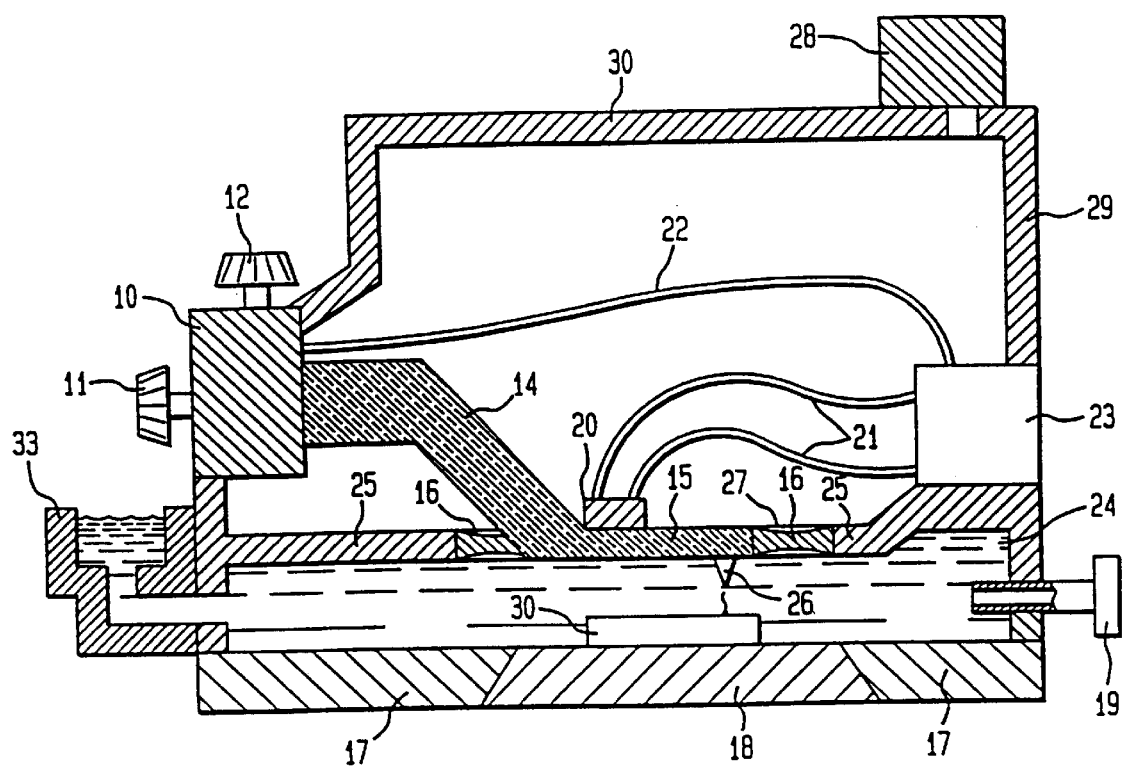
FIG. 1b: the embodiment of FIG. 1a in top view.
Figure 1B:
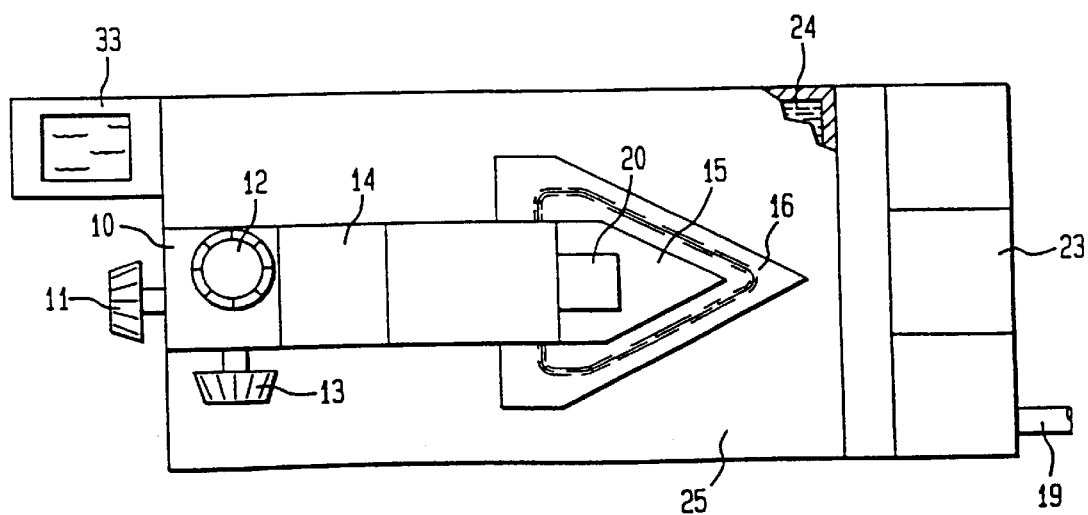

In FIG. 1a an investigation and/or manipulation device, particularly an atomic force microscope (AFM) is schematically shown. The investigation and/or manipulation device comprises an investigation and/or manipulation tool 26 which here is a tip and which is attached to the underside of a longitudinal cantilever 15. The cantilever 15 is itself attached to a probe holder 14. The probe holder 14 is stiffer than the cantilever 15 which has an inherent defined elasticity. The cantilever holder 14 is movably borne in a positioning means 10 which here comprises a positioning wheel 11 for the x-coordinate, a positioning wheel 12 for the x-coordinate and a positioning wheel 13 for the z-coordinate which all are connected via not shown driving mechanisms to the cantilever holder 14. The positioning means 10 is placed in a side wall of a housing 29 which comprises further a bottom housing wall 17, a top housing wall 30 and an intermediate housing wall 25. The intermediate housing wall 25 is a horizontal wall that separates the housing 29 into two chambers, an upper chamber and a lower chamber. The cantilever 15 is arranged horizontally in the plane of the intermediate housing wall 25, while the probe holder 14 extends in an angle away from the intermediate housing wall 25 upwards to the positioning means 10 in the upper chamber. The lower chamber is filled with a container fluid 24. The intermediate housing wall 25 has a hole that surrounds the cantilever 15 which here has a triangular shape, viewed perpendicularly to the plane of the intermediate housing wall 25. Between the intermediate housing wall 25 and the cantilever 15 remains a gap 27 which is bridged by a movable means 16. The movable means 16 is here a flexible means, e.g. a membrane means. In a side wall of the lower chamber is arranged a tube piece which is an outlet respective inlet of a supply and/or removing means 19 for the container fluid 24. Underneath the investigation and/or manipulation tool 26 is located a sample 30 which is situated upon a sample holder 18 which itself is borne in a fitting hole in the bottom housing wall 17. The cantilever 15 bears on its upper side a sensing means 20 which is connected via two sensor connector lines 21 to a control and data-receiving means 23. The positioning means 10 is connected to the control and data-receiving means 23 via a positioner connector line 22. In the top housing wall 30 is arranged a hole and above this hole a counter-pressure-exerting means 28. The lower chamber is further equipped with a fluid equilibration means 33 which is partially filled with the container fluid 24.

The positioning means 10 acts as a means for controlling the relative position between the sample 30 and the tip 26, at least for a coarse approach. The control and data-receiving means 23 serves for a control of the fine positioning and transmits via the positioner connector line 22 positioning data to the positioning means 10 which uses this data and the driving mechanisms to perform the fine positioning too. The cantilever 15 moves within the hole in the intermediate housing wall 25 which here serves as a flow-limiting means. This means that the container fluid 24 is prevented by this intermediate housing wall 25 from flowing into the upper chamber with exception of area of the gap 27.

The movable means 16 prevents the container fluid 24 from flowing through the gap 27 and the cantilever 15 also is a barrier for the container fluid 24. Hence, the upper chamber is kept free from the container fluid 24 by the flow-limiting means 25, the cantilever 15, and the movable means 16. The movable means 16 is designed to have an elasticity which allows the cantilever 15 to move around in the limits of the gap 27 following the control data without or at least with only few mechanical interaction to the movable means 16 or even the intermediate housing wall 25. The movable means 16 need not be obligationally designed as a bridge element that closes the gap 27 completely. It may even be introduced in the gap 27 as an element that reduces the effective area of the gap 27 such that the surface tension is sufficient for preventing the container fluid 24 from flowing through the gap 27.

The sample 30 is before its investigation arranged on the sample holder 18 which then is fitted into the corresponding hole in the bottom housing wall 17. Afterwards, the lower chamber is filled with the container fluid 24. The lower chamber may have an exchange opening for superfluous air to find its way out of and/or into the lower chamber while the container fluid 24 is being supplied or removed. The sensing means 20 on the cantilever 15 is for example a piezoresistive sensor and it transmits its measured resistive value to the control and data-receiving means 23. Hence, with the control and data-receiving means 23 controlling the position of the tool 26 with respect to the sample 30, the measured deflection data for each position of the tool 26 is collected and may be visualized or further processed. The counter-pressure-exerting means 28 serves for varying the gas pressure in the upper chamber. This may be done additionally to balance the pressure that is exerted by the container fluid 24 on the movable means 16. This counter-pressure-exerting means then can also be used to adjust the vertical position of the movable means 16 and with it the cantilever 15 and the tool 26.

The embodiment can be varied in that the movable means 16 is omitted. Then the surface tension of the container fluid 24 can be used as a means for preventing the container fluid 24 from flowing through the gap 27. The dimensions of the gap 27 have of course an impact on the ability to achieve this flow barrier. The smaller the gap 27, the lower the surface tension needs to be. This may again be combined with the possibility to exert counter-pressure by the counter-pressure-exerting means 28 whose pressure now directly acts on the surface of the container fluid 24.

The two chambers may even be separated such that the lower chamber is movable relative to the upper chamber, e.g. in that the lower chamber is realized as a container which is bigger than the dimensions of the cantilever 15 with the tool 26 and with the surrounding upper chamber, such that the upper chamber together with the cantilever 15 and the tool 26 dip into the container fluid 24 inside of the lower chamber.

The fluid equilibration means 33 serves for balancing the container fluid pressure, i.e. for delivering additional container fluid 24 if the fluid pressure in the lower chamber is decreasing and for taking up superfluous container fluid 24 if the pressure increases. This is particularly important for arrangements where the container fluid 24 is mainly incompressible and has no space to move when the cantilever 15 approaches the sample 30 and hereby increases the pressure.

An alternative possibility for providing the pressure equilibration is an arrangement where the lower chamber is not completely filled with the container fluid 24. For instance a simple droplet of the container fluid 24 which just suffices to keep the sample 30 and the tool 26 immersed provides a very natural behavior which solves the equilibration problem, namely in that it changes its shape. Particularly when the droplet is kept at its place by e.g. a capillary force there will be enough room for the droplet surface to move outwards or inwards and also only a small surface which allows the droplet to dry out. For counteracting a dry-out generally a fluid supply can be used which balances fluid losses due to evaporation. Another advantage for using a droplet is the fact that the equilibration process, here the movement of the droplet surface is not very inert because only a small mass is moved. This allows very quick movements of the cantilever 15, particularly in the z-direction The boundaries of a droplet or generally of any interface between a liquid and a gas usually form a curved surface which is called a meniscus and which to a certain extent also exerts a force to planes which are in contact with it. On one hand, this force can be used by defining it through the dimensions and the position of the meniscus, on the other hand, this force may be avoided to create detrimental effects. In the case of the cantilever 15, the most sensitive direction is the z-direction, because it is the direction of the flexibility of the cantilever 15 and in which e.g. atomic forces are determined to deflect the cantilever. Such atomic forces may be much smaller than a force exerted by a meniscus. Therefore, choosing the position of the meniscus such that its force direction is in the x-y plane is a suitable method to avoid problems due to meniscus-related interfacial forces.

In this embodiment, the cantilever 15 and the tool 26 are movable relatively to the flow-limiting means 25 in all three dimensions. Hence, the connection to the flow-limiting means 25 for this embodiment needs to provide a respective motion possibility or a respective flexibility in all these directions. It may also be interesting to add additional fluid supplies such that different fluids can be filled into the lower chamber sequentially or even simultaneously.

The fluid pressure of the lower chamber can also be used for the positioning of the tool 16 relative to the sample 30. On one hand, the fluid pressure, respective of the movement of the container fluid 24 in the fluid equilibration means 33 can be measured to obtain a value that is directly related to the position of the cantilever 15 and the tool 26 with respect to the sample 30. This value can hence be used in a control loop for controlling the tool position.

Another possibility is the positioning of the tool 26 via the fluid pressure. Acting directly on the fluid pressure in a closed system, hence, a closed lower chamber, will cause the cantilever 15 to move. With different cross-sections of pumping/suction means, easily different pressure resolutions can be achieved. This represents a very sophisticated solution for the positioning.

Figure 2:
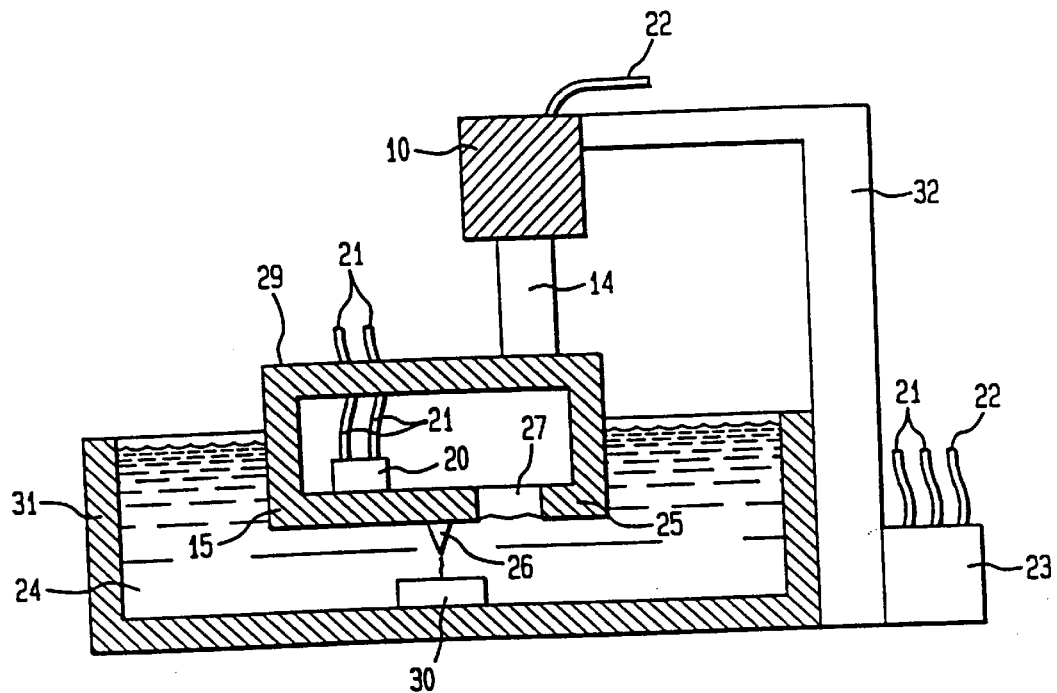
FIG. 2: a second embodiment of an investigation and/or manipulation device according to the invention in side view.

FIG. 2 shows such an embodiment where the lower chamber and the upper chamber are separated. The numbering of the precedent figures has been kept as far as identical parts are concerned. The cantilever 15 bearing the tool 26 is integrated as bottom wall part into the housing 29 that builds the flow-limiting means 25. The housing 29 now only comprises the upper chamber. Again the gap 27 is located around the cantilever 15. In the interior of the housing 29 is arranged on the cantilever 15 the sensing means 20 which again has two sensor connector lines 21 which are guided through the top housing wall 30 and are connected to the control and data-receiving unit 23. The housing 29 is now as a whole attached to the probe holder 14 which is borne at the positioning means 10. The positioning means 10 is here a fully automated positioner which responds to position control signals which arrive via the positioner connector line 22 from the control and data-receiving unit 23. The positioning means 10 is held by a support element 32 which defines the position of the positioning means 10 with respect to the lower chamber which here is a basin 31. Inside the basin 31 is located the sample 30 immersed in the container fluid 24. The control and data-receiving unit 23 is here located at the support element 32.

Now, the positioning means 10 is used for positioning the cantilever 15 with the tool 26 and the complete housing 29. In reality, the housing 29 can be made very small, e.g. only big enough to surround the sensing element 20 with associated electronics. Then the housing 29 is also movable with the positioning means 10 without or with only negligible additional effect. Here the surface tension of the container fluid 24 is helping to prevent the container fluid 24 from flowing through the gap 27. This makes the production of the arrangement cheaper and minimizes mechanical influence of the flow-limiting functionality on the cantilever 15.

In this embodiment, the cantilever 15 is movable relatively to the flow-limiting means 25 only in the direction vertical to the cantilever elongation, the so-called z-direction. Hence an eventual movable means 16 need only provide a movability or flexibility in this direction.

The housing 29 need not be closed at its upper side, but can also be open which could be used for easy access even during operation or pressure equilibration or other purposes.

To choose identical materials, the movable means 16 and the cantilever 15 can be a solution which is easily producable because then the cantilever 15 and the movable means 16 may be produced with an identical process, e.g. a lithographic process. The thickness of the movable means 16 is then a good parameter to determine its flexibility. It is even possible to make the movable means 16 and the cantilever 15 from one single piece, i.e. that there is no boundary visible between them. It is even possible also to choose identical materials for the movable means 16 and the flow-limiting means 25 which leads to the same advantages as the previous example, hence a facilitated manufacturing process. Making the movable means 16 and the flow-limiting means 25 from one single piece, i.e. that there is no boundary visible between them, is again possible.

Figure 3:
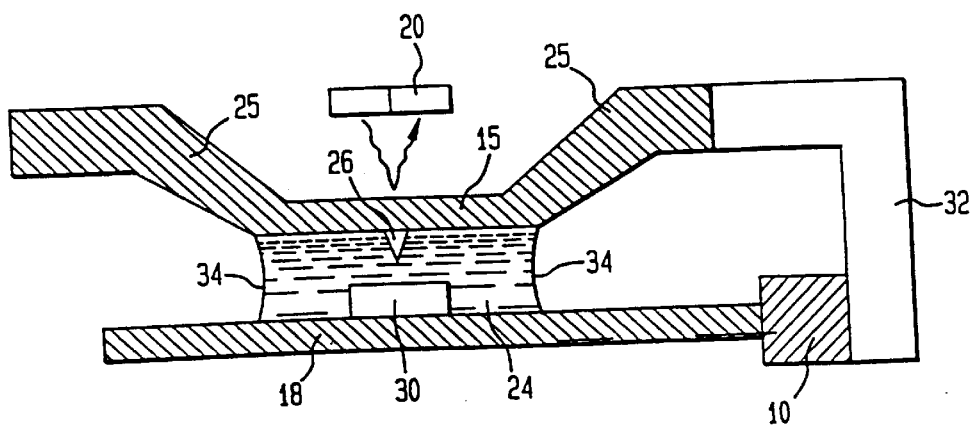
FIG. 3: a third embodiment of an investigation and/or manipulation device according to the invention in side view.

This leads directly to the third embodiment depicted in FIG. 3. For sake of clarity not all elements that are needed for the use of this arrangement are depicted in this figure. However, they can easily be adopted from the other embodiments shown and described above.

The flow-limiting means 25 is connected to the cantilever 15 on both ends of the cantilever 15. The sample 30 is immersed in a droplet of the container fluid 24 which produces two menisci 34 between the underside of the flow-limiting means 25 and the sample holder 18. The positioning means 10 is here arranged at the sample holder 18 and again fixed to the support element 32 which also holds the flow-limiting means 25. As the sensing means 20, an optical arrangement comprising a light source and a light detector for reflected light, e.g based on interference, is provided.

The cantilever 15 is itself performing the function of the movable means 16 such that the gap 27 here is totally filled and no longer distinguishable and also no separated movable means 16 is any more distinguishable. Hence, the cantilever 15 is integrated into the flow-limiting means 25. The positioning means 10 moves the sample 30, which also leads to a relative movement between the tool 26 and the sample 30. The two menisci 34 are not located at the cantilever 15 which brings the advantage that their meniscal or capillary force does not influence the cantilever position, but is effective only on the flow-limiting means 25 which here is less fexible than the cantilever 15. Pressure equilibration is achieved by a movement of the menisci 34 in the x-y plane.

The cantilever 15 need not have an elongated form but can have any shape that is suitable for the desired behavior. In FIG. 3 it can even have a circular shape, e.g. with the tool 26 being attached in its center.

Another non-depicted embodiment is the possibility to arrange the flow-limiting means 25 directly on the cantilever 15, e.g. as a simple wall element with a predetermined height and/or shape. The flow-limiting means 25 then functions similarly to an obstacle whose height has to be surmounted by the container fluid 24 to reach the part of the cantilever 15 that has to remain dry. Hence the height and/or shape can be chosen according to the maximal motion range of the cantilever 15, such that it is impossible for the container fluid 24 to surmount the dimensions of the flow-limiting means 25.

The cantilever 15 can also itself be designed such that it closes the gap 27 and is arranged close to the flow-limiting means 25 and maybe providing tightness of the connection interface by some tightening means, such as a tightening lip or a tightening fluid. This arrangement can be interpreted as the movable means 16 being integrated into the cantilever and hence moved by it.

In all embodiments, the upper side of the cantilever 15 remains at least partially free from the container fluid 24. By this, anything located on this upper surface is not prone to destructive or deteriorating effects of the container fluid 24. Particularly, an electrically conductive or chemically aggressive container fluid 24 could otherwise influence in a negative way the behavior of the cantilever 15 and hence the measuring results. With the invention, therefore, a broader choice for the container fluid 24 is possible without having to take care of eventual effects on the upper side of the cantilever 15 and particularly on hardware located on this upper side, such as the sensing means 20 and the sensor connector lines 21. Also, effects of the container fluid 24 on the measuring process or the positioning control process for the cantilever 15 are reduced. With regard, for example, to optical measurement, the way of the light is not disturbed by the container fluid 24.

The use of the gap 27 is on one hand a very easy-to-realize solution of this problem and on the other hand permits to keep the upper side of the cantilever 15 free from any other means which could be used to prevent the upper side from getting into contact with the container fluid 24. Using a sealing layer for electronic parts on the cantilever 15 for instance, clearly changes the mechanical behavior of the cantilever 15 and also implies the need of choice of a proper sealing material and the application of this material, which are additional process steps that also imply the risk of damage and disfunctionality. Also the sealing material may not be suitable for all kinds of container fluids 24 and may be subject to damages, sealing defects, aging, or wear.

With the invention, the cantilever 15 is principally unmodified which facilitates its use and the use of unmodified or only slightly modified environment including hardware as well as software which otherwise would have to be adapted to the modified cantilever 15. This applies particularly to the embodiment with only the gap 27 between the cantilever 15 and the flow-limiting means 25.

Furthermore, the space above the cantilever 15 is easily accessible and leaves the opportunity to exchange, add, remove, and test components that are located there or on the cantilever 15. This would be extremely more difficult when using e.g. a sealing means.

Also, any type of sensing means 20, should it rely on optical, magnetic, electrical, or whatever principles, is expected to function better when it is freely accessible and not e.g. disturbed by a sealing means and also the container fluid 24.

An assistant fluid may also be introduced in the upper chamber. This fluid can be chosen with adjusted properties such as surface tension, density, chemical properties a.s.o. Particularly, for use of a capacitive measurement of the deflection of the cantilever 15, the dielectric properties may also be of concern. Choosing a hydrophobic assistant fluid may additionally help to keep the container fluid 24 away if this is hydrophilic and vice versa.

Capacitive measuring of the cantilever's deflection is also a method that is prone to the dielectricum between the capacitor plates. The container fluid 15 could have a negative effect on such measuring or even render this principle not usable. With just air, a gas or the assistant fluid with well defined dielectric properties, such measurement can again be used without problems.

Introducing weakening structures or constrictions in the cantilever 15 to achieve a concentration of mechanical stress at predetermined locations, can still be done as long, as the weakening structure or constriction is also suited to prevent the container fluid 24 from flowing to the upper side of the cantilever 15. This means that weakening openings should be designed with dimensions that allow the surface tension of the cantilever fluid 24 to be effective in the above sense. Otherwise additional bridge elements may be introduced in such openings to reduce the effective opening.

The invention also includes embodiments where a part of the upper surface of the cantilever 15 is in contact with the container fluid 24 but another part is not. Then it may be an appropriate solution to arrange the flow-limiting means 25 at the borderline between the region which remains dry or uncovered and the region that is allowed to be in contact with the container fluid 24. Again, the gap 27 between the cantilever 15 and the flow-limiting means 25 should be big enough to allow correct operation of the investigation and/or manipulation tool 26 and nevertheless designed to ensure the protection of the dry region, i.e. where the container fluid 24 is not allowed to flow, from the container fluid 24. In the dry region again all advantages of the invention occur, e.g. the possibility to use a piezoresistive sensing means 20 without a fluid-impermeable sealing means.

The term "fluid" in the context of the invention shall include liquids, such as water, as well as gases. As the tool 26 particularly an AFM tip can be used. This tip 26 is approached to the surface of the sample 30 and is attracted by the atomic forces of the surface molecules of the sample 30. The deflection is also effective on the cantilever 15 which provides a restoring force to the tip 26. The deflection of the cantilever 15 can then be measured with any known sensing method, e.g. by measurement of light reflected at the cantilever 15 or capacitive measurement, using the cantilever 15 as one of the capacitor plates. When the distance between the tool 26 and the sample 30 is reduced such that the tool 26 touches the surface of the sample 30 then the tool 26 can be used to create indentations and hence arbitrary patterns on the surface of the sample 30.

Concerning the positioning process, various possibilities exist, e.g. positioning the sample 30 while not moving the cantilever 15 with the tool 26, or moving both with one or several positioning means 10. With such an arrangement for instance a coarse approach, i.e. with a large motion range but a small motion resolution between the sample 30 and the tool 26 can be achieved by one of the positioning means 10 and a fine approach, i.e. an approach with a small motion range but a high motion resolution can be achieved with the other positioning means 10.

The movable means 16 can comprise a solid material but also fluidic material, such as e.g. a magnetic oil which is held in the gap 27 by a magnetic arrangement. Such a fluidic movable means 16 has extremely low mass and low viscosity which leads to an extremely high movability, respectively flexibility. Also other viscous media, e.g. a lipid film may be used as movable means 16. Generally, the movable means 16 can as well be flexible means, elastic means, or any combination of the same. The movability need only be adapted to the needs that are provided by the arrangement.

The sample 30 can also already be immersed in a droplet or more of the container liquid 24 when it is introduced into the arrangement, respectively into the lower chamber, which makes clear that the supply-removing means 19 is not obligatory.

The invention provides a possibility to investigate and/or manipulate the sample 30 which is immersed in the container fluid 24 while the cantilever 15 is not immersed totally in the container fluid 24. If one simply immersed the cantilever 15 partly into the container fluid 24, the capillary force of the interface between the container fluid 24, the adjacent medium, e.g. air, and the cantilever 15 would have a direct disturbing influence on the cantilever behavior. The solution of this problem according to the prior art was to immerse the cantilever 15 totally in the container fluid 24. The invention goes another way in that the arrangement of the cantilever 15 and of its environment is designed such that the cantilever 15 is not disturbed by such forces. To design the arrangement in a way which decreases or even avoids meniscal or capillary forces or their effect on the cantilever 15 is an object of the invention. This is obtained by either positioning the menisci 34 away from the cantilever 15 or positioning them at a portion of the cantilever 15 where the influence of the forces is reduced, e.g. because the momentum created by the forces is reduced due to a shorter effective lever and/or by positioning them such that the created force is directed stronger in the direction perpendicular to the direction in which the tool 26 is lowered onto the sample 30, here the z-direction. The container fluid 24 then influences the measurement to the lowest extent.

Any disclosed embodiment may be combined with one or several of the other embodiments shown and/or described. This is also possible for one or more features of the embodiments.

What is claimed is:

1. Investigation and/or manipulation device for a sample which is located in a container fluid, comprising:
   a cantilever;
   an investigation and/or manipulation tool which is mounted at a first side of said cantilever and which during investigation and/or manipulation of said sample immerses into said container fluid; and
   means for positioning said investigation and/or manipulation tool relative to said sample,
   wherein during investigation and/or manipulation, a second side of said cantilever which lies opposite to said first side is at least partly not immersed into said container fluid.

2. Investigation and/or manipulation device according to claim 1, further comprising an adjacent flow-limiting means separated from said cantilever by a gap,
   wherein the second side of the cantilever is at least partly not immersed into the container fluid because said cantilever is separated from said adjacent flow-limiting means by said gap through which said container fluid is prevented from flowing.

3. Investigation and/or manipulation device according to claim 2, further comprising movable means, arranged in said gap, for preventing said container fluid from flowing through the gap.

4. Investigation and/or manipulation device according to claim 2 wherein said container fluid has a surface tension which prevents said container fluid from flowing through the gap.

5. Investigation and/or manipulation device according to claim 4, wherein said gap is dimensioned such that the surface tension of the container fluid prevents said container fluid (24) from flowing through said gap.

6. Investigation and/or manipulation device according to claim 2, further comprising a counter-pressure-exerting means for exerting a counter-pressure on said container fluid such that said container fluid is prevented from flowing through the gap.

7. Investigation and/or manipulation device according to claim 2, further comprising an assistant fluid for building an interface towards said container fluid, thereby preventing said container fluid from flowing through the gap.

8. Investigation and/or manipulation device according to claim 1, further comprising an adjacent flow-limiting means connected to said cantilever, such that the second side of the cantilever is at least partly not immersed into the container fluid.

9. Investigation and/or manipulation device according to claim 1, further comprising sensing means for sensing a deflection of the cantilever due to a force between the sample and the investigation and/or manipulation tool.

10. Investigation and/or manipulation device according to claim 9, wherein said sensing means is located at the second side of the cantilever.

11. Investigation and/or manipulation device according to claim 1, further comprising supply and/or removing means for respectively supplying to and removing the container fluid from the investigation and/or manipulation device.

12. Investigation and/or manipulation device for a sample which is located in a fluid, comprising:
  a cantilever; and
  an investigation and/or manipulation tool mounted at a first side of said cantilever and which during investigation and/or manipulation of said sample immerses into said fluid,
  wherein during investigation and/or manipulation, a second side of said cantilever which lies substantially opposite to said first side is at least partly not immersed into said fluid.

13. Investigation and/or manipulation device according to claim 12, further comprising:
  a positioning member for positioning said investigation and/or manipulation tool relative to said sample; and
  an adjacent flow-limiting member separated from said cantilever by a gap,
  wherein the second side of the cantilever is at least partly not immersed into the fluid because said cantilever is separated from said adjacent flow-limiting member by the gap through which said fluid is prevented from flowing.

14. Investigation and/or manipulation device according to claim 13, further comprising:
  a movable member arranged in the gap for preventing said fluid from flowing through the gap.

15. Investigation and/or manipulation device according to claim 14, wherein said gap is dimensioned such that the surface tension of the fluid prevents said fluid from flowing through said gap.

16. Investigation and/or manipulation device according to claim 13, wherein said fluid has a surface tension which prevents said fluid from flowing through the gap.

17. Investigation and/or manipulation device according to claim 13, further comprising:
  a counter-pressure-exerting member for exerting a counter-pressure on said fluid such that said fluid is prevented from flowing through the gap.

18. Investigation and/or manipulation device according to claim 13, further comprising:
  an assistant fluid for building an interface towards said fluid, thereby preventing said fluid from flowing through the gap.

19. Investigation and/or manipulation device according to claim 12, further comprising:
  an adjacent flow-limiting member connected to said cantilever, such that the second side of the cantilever is at least partly not immersed into the fluid.

20. Investigation and/or manipulation device according to claim 12, further comprising:
  a sensor for sensing a deflection of the cantilever due to a force between the sample and the investigation and/or manipulation tool,
  wherein said sensor is located at the second side of the cantilever.

* * * * *